(12) United States Patent
Utsumi et al.

(10) Patent No.: US 8,589,008 B2
(45) Date of Patent: Nov. 19, 2013

(54) ELECTRIC VEHICLE

(75) Inventors: Shintaro Utsumi, Susono (JP);
Nobuhisa Jingu, Izunokuni (JP);
Hirotsugu Ojima, Susono (JP);
Motohiro Yuge, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/515,968

(22) PCT Filed: Dec. 15, 2009

(86) PCT No.: PCT/JP2009/070910
§ 371 (c)(1),
(2), (4) Date: Jun. 14, 2012

(87) PCT Pub. No.: WO2011/074074
PCT Pub. Date: Jun. 23, 2011

(65) Prior Publication Data
US 2012/0253578 A1 Oct. 4, 2012

(51) Int. Cl.
*B60W 20/00* (2006.01)

(52) U.S. Cl.
USPC .......................................................... 701/22

(58) Field of Classification Search
USPC ......... 701/22; 307/9.1, 10.1, 18, 43; 318/105; 180/65.265
See application file for complete search history.

(56) References Cited

U.S. PATENT DOCUMENTS

| 2008/0006045 A1* | 1/2008 | Brummett ........................ 62/236 |
| 2009/0101422 A1* | 4/2009 | Subramanian ............. 180/65.31 |
| 2009/0312129 A1* | 12/2009 | Park et al. ......................... 475/5 |

FOREIGN PATENT DOCUMENTS

| JP | 58-54326 U | 4/1983 |
| JP | 63-63037 U | 5/1985 |
| JP | 10-117404 A | 5/1998 |
| JP | 2001-020818 A | 1/2001 |
| JP | 2001-119813 A | 4/2001 |
| JP | 2001-295715 A | 10/2001 |
| JP | 2003-3341797 A | 12/2003 |
| JP | 2004-019565 A | 1/2004 |
| JP | 2005-112095 A | 4/2005 |
| JP | 3123731 U | 7/2006 |
| JP | 2007-116788 A | 5/2007 |
| JP | 2008-174193 A | 7/2008 |
| JP | 2008-263734 A | 10/2008 |
| JP | 2009-82618 A | 4/2009 |

OTHER PUBLICATIONS

International Search Report of PCT/JP2009/070910 mailed Mar. 16, 2010.

* cited by examiner

*Primary Examiner* — Yonel Beaulieu
*Assistant Examiner* — Martin Weeks
(74) *Attorney, Agent, or Firm* — Kenyon & Kenyon LLP

(57) ABSTRACT

An electrically driven vehicle includes a vehicle body, a battery that is mounted in the vehicle body and is usable for running, and a generator unit that is detachably mounted in the vehicle body and charges the battery, a first fuel tank that stores fuel supplied to the generator unit being provided in the vehicle body. The generator unit includes a generator-unit-side fuel tank that stores fuel of the generator unit, and a fuel pipe is provided so as to detachably connect a vehicle-side fuel tank and the generator-unit-side fuel tank.

8 Claims, 6 Drawing Sheets

ELECTRIC VEHICLE

This is a 371 national phase application of PCT/JP2009/070910 filed 15 Dec. 2009, the content of which is incorporated herein by reference.

FIELD OF THE INVENTION

The present invention relates to electrically driven vehicles, and more particularly, to an electrically driven vehicle equipped with a battery usable for running.

BACKGROUND OF THE INVENTION

Conventionally, there is known an electrically driven vehicle equipped with a battery usable for running. Such an electrically driven vehicle has a limited cruising range that depends on the amount of charge in the battery. In this regard, there is known an electrically driven vehicle in which a generator unit that charges the battery is further mounted (see Patent Document 1).

The case where the generator unit is mounted needs a supply of fuel thereto. In this regard, Patent Documents 2 and 3 disclose arts that may relate to the present invention in light of disclosure of a fuel tank that is newly provided.

Patent Document 4 discloses an art that may relate to the present invention in light of a fuel tank that is refueled from the outside of the vehicle.

Patent Documents 5 through 7 disclose arts that may relate to the present invention in light of the refuel from the fuel tank.

PRIOR ART DOCUMENTS

Patent Documents

Patent Document 1: Japanese Patent Application Publication No. 10-117404
Patent Document 2: Japanese Patent Application Publication No. 2007-116788
Patent Document 3: Japanese Patent Application Publication No. 2004-19565
Patent Document 4: Japanese Utility Model Registration No. 3123731
Patent Document 5: Japanese Patent Application Publication No. 2003-341797
Patent Document 6: Japanese Patent Application Publication No. 2001-295715
Patent Document 7: Japanese Patent application Publication No. 2001-20818

SUMMARY OF THE INVENTION

Problems to be Solved by the Invention

In the electric vehicle equipped with the generator unit disclosed in Patent Document 1, the generator unit is constantly mounted when the vehicle is in use. Therefore, the electric vehicle has an increase in weight that corresponds to the generator unit, and has a degraded energy efficiency.

In contrast to this, it is conceivable that the generator unit (which may be an engine driven type of generator unit or a fuel cell type of generator unit) is detachably mounted in the vehicle, for example. In this case, the generator unit is removed as necessary, and the degradation of the energy efficiency resulting from the increased weight can be suppressed.

In the case where the generator unit is detachably mounted, there is an issue of the method for supplying fuel to the generator unit. In the detachable mounting of the generator unit, it is conceivable to provide a fuel tank in the generator unit, for example. Even in the case where the generator unit is detachably mounted, there is no need to detachably mount a fuel supply system for supplying fuel from the fuel tank, so that the occurrence of fuel leakage in removal or installation of the generator unit can be surely prevented. Also, in this case, it is possible to attempt to realize a simplified structure by arranging the structure so as to directly supply fuel to the fuel tank in the generator unit from the outside of the vehicle in a state in which the generator unit is mounted in the vehicle. Further, in this case, the generator unit removed from the vehicle can be operated solely, and the battery may be charged remotely.

However, in this case, the mounted position of the generator unit such as a position under the floor of the vehicle may degrade the convenience of the fuel supply from the outside. On the contrary, the mounted position of the generator unit may be limited in order to secure the convenience of the fuel supply from the outside. Such limitation is inconvenient for ensuring a certain degree of freedom of designing the whole vehicle. In this regard, it is conceivable that a supply of fuel to the fuel tank of the generator unit from the outside may be carried out after the generator unit is removed from the vehicle. However, this case needs work to remove the generator unit and degrades the convenience.

In the case where the generator unit is equipped with the fuel tank, the capacity of the fuel tank may be limited to a certain extent in light of weight and handling because the fuel tank is detachably mounted in the generator unit. Therefore, the case may need refuel more frequently and may degrade the convenience. Further, the present case has a limited total amount of generation of energy that can be ensured at maximum without new refuel from the outside. Thus, the present case has a further problem because in a certain usage environment of the electrically driven vehicle, it is not felt that the amount of generation of energy that can be ensured at maximum is sufficient to make up for the shortage of energy of the battery.

The present invention was made in view of the above problems, and aims at providing an electrically driven vehicle with a generator unit being detachably mounted, capable of ensuring a certain degree of freedom of the mounted position of the generator unit while ensuring the convenience of a supply of fuel from the outside and improving the convenience of coping with a shortage of energy of the battery.

The present invention for solving the above problems is an electrically driven vehicle comprising: a vehicle body; a battery that is mounted in the vehicle body and is usable for running; and a generator unit that is detachably mounted in a vehicle body and charges the battery, a first fuel tank that stores fuel supplied to the generator unit being provided in the vehicle body, the generator unit including a second fuel tank that stores fuel for the generator unit; and a fuel supply system being provided so as to detachably connect the first and second fuel tanks together.

Also, the present invention is preferably configured so that the fuel supply system is connected to the second fuel tank so that fuel supplied is poured into the second fuel tank; and the electrically driven vehicle further comprising: flow change means capable of changing a flow state of fuel passing through the fuel supply system; control means for controlling the flow change means so as to intermittently supply the fuel to the second fuel tank; and operation control means for making the generator unit temporarily operate when the control means controls the flow change means to intermittently supply the fuel to the second fuel tank.

Also, the present invention is preferably configured so that the first fuel tank is provided in a position lower than that of the second fuel tank, and a detachably attached part that makes it possible to attach and detach the first fuel tank and the second fuel tank to and from each other is provided to a portion of the fuel supply system extending to the second fuel tank from a lower side thereof, switch means capable of allowing the fuel to pass and inhibiting the fuel from passing being provided to another portion of the fuel supply system closer to the second fuel tank than the detachable attached part; and the electrically driven vehicle further comprises: fuel pumping means that is provided in the first fuel tank and is capable of pumping the fuel from the first fuel tank to the second fuel tank; control means for controlling the fuel pumping means and the switch means so as to intermittently supply the fuel to the second fuel tank; a fuel return system that has one end connected to a portion of the fuel supply system closer to the first fuel tank than the detachably attached part and another end connected to the first fuel tank, and is provided so that the fuel flows under its own weight from the fuel supply system to the first fuel tank; and relief means, provided in the fuel return system, for increasing the fuel passing therethrough in accordance with a pressure of the fuel in the fuel supply system when the pressure of the fuel is lower than a predetermined value.

Also, the present invention is preferably configured so as to further comprise estimate means for estimating an amount of fuel remaining in the second fuel tank on the basis of an operation state of the generator unit.

Also, the present invention is preferably configured so that a wall portion of a housing of the generator unit is included in at least part of a wall portion that forms the second fuel tank.

The second present invention for solving the problems is an electrically driven vehicle comprising: a vehicle body; a battery that is mounted in the vehicle body and is usable for running; and a generator unit that is detachably mounted in the vehicle body and charges the battery, a first fuel tank that stores fuel supplied to the generator unit being provided in the vehicle body, the generator unit being an engine driven type of generator unit, a fuel supply system being provided so as to detachably mount the engine of the generator unit and to detachably connect the first fuel tank and the engine together, the first fuel tank being provided in a position lower-than that of the engine, and a detachably attached part that makes it possible to attach and detach the first fuel tank and the engine to and from each other being provided to a portion of the fuel supply system extending to the engine from a lower side thereof; the electrically driven vehicle further comprising: fuel pumping means that is provided in the first fuel tank and is capable of pumping the fuel from the first fuel tank to the engine; control means for controlling the fuel pumping means so as to supply the fuel to the engine and stop supplying the fuel to the engine; a fuel return system that has one end connected to a portion of the fuel supply system closer to the first fuel tank than the detachably attached part and another end connected to the first fuel tank, and is provided so that the fuel flows under its own weight from the fuel supply system to the first fuel tank; and relief means, provided in the fuel return system, for increasing the fuel passing therethrough in accordance with a pressure of the fuel in the fuel supply system when the pressure of the fuel is lower than a predetermined value.

Effects of the Invention

According to the present invention, it is possible to ensure a certain degree of freedom of the mounted position of the generator unit while ensuring the convenience of a supply of fuel from the outside and to improve the convenience of coping with a shortage of energy of the battery.

BRIEF DESCRIPTION OF DRAWINGS

FIGS. 9(a) and 9(b) are diagrams of a relief valve in which FIG. 9(a) illustrates the relief valve when it is closed, and FIG. 9(b) illustrates the relief valve when it is opened;

DETAILED DESCRIPTION

Now, a description is given of modes for carrying out the invention in conjunction with the drawings.

Figure 1:
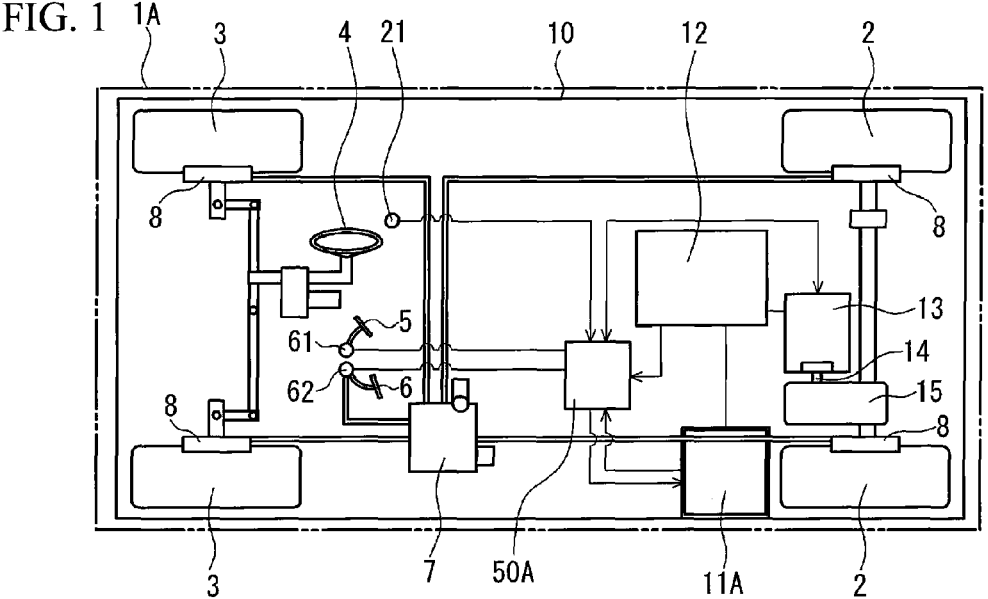
FIG. 1 is a diagram of a schematic structure of an electrically driven vehicle in accordance with a first embodiment.

First, a first embodiment is described. Referring to FIG. 1, an electrically driven vehicle 1A has a vehicle body 10 in which a generator unit 11A, a battery 12, and an electric motor 13 are mounted. The electrically driven vehicle 1A is configured so that the generator unit 11A is detachably mounted. The electrically driven vehicle 1A capable of detachably installing the generator unit 11A can be operated in a state in which the generator unit 11A is not mounted and is electrically disconnected.

Figure 2:
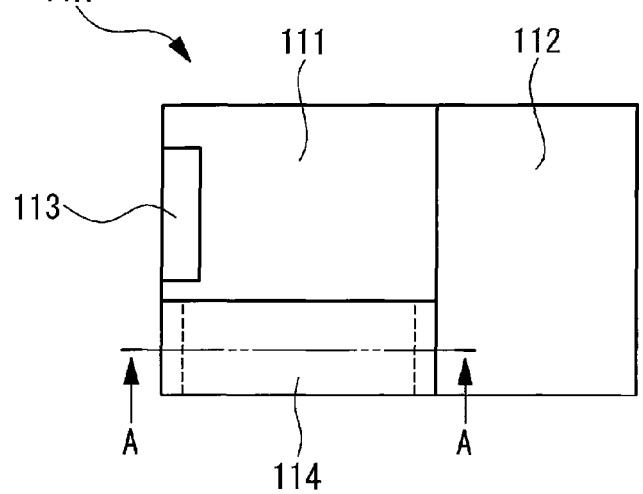
FIG. 2 is a diagram of a generator unit in accordance with the first embodiment.
Figure 3:
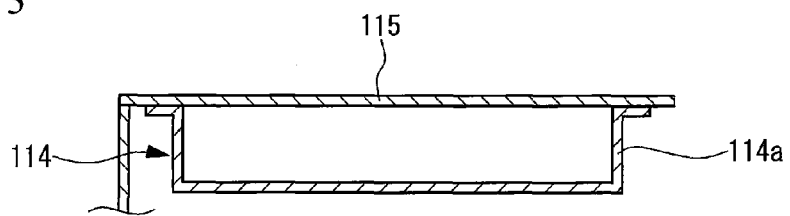
FIG. 3 is a cross-sectional view taken along a line A-A in FIG. 2.

The generator unit 11A is an engine driven type of generator unit, and is equipped, as illustrated in FIG. 2, with an engine 111, a generator 112, an ECU 113, and a fuel tank 114 on the generator unit side. The engine 111 drives the generator unit 112, which generates alternating current. Then, the alternating current thus generated is converted to direct current by a not-illustrated rectifying circuit before being charged in the battery 12. The ECU 113 on the generator unit side is provided for primarily controlling the engine 111. The fuel tank 114 on the generator unit side is connected to the engine 111 so that fuel can be supplied thereto, and stores fuel for the generator unit 11A (specifically, engine 111). As illustrated in FIG. 3, part of a wall portion 114a that forms the fuel tank 114 on the generator unit side is a wall portion of a housing 115 of the generator unit 11A. In this regard, specifically, the generator unit 11A is detachably mounted under the floor, and the part of the wall portion is an element that defines the overall height of the generator unit 11A in the mounted attitude. The fuel tank 114 on the generator unit side corresponds to the second fuel tank.

As illustrated in FIG. 1, the battery 12 is a direct current battery, and is electrically and detachably connected to the generator unit 11A via high-voltage system wires that are power-system wires. Energy generated by the generator unit 11A is stored in the battery 12 via the high-voltage system wires. The battery 12 may be configured to have multiple batteries having a rated DC voltage of 12 V connected in series, for example. The electric motor 13 is a source for running, and is a DC motor. The electric motor 13 is supplied with energy from the battery 12, and rotates an output shaft 14. Then, the rotary output is transmitted, via a transmission 15, to a pair of right and left rear wheels 2, which are driving wheels, so that the rear wheels 2 can be driven. As described above, the electrically driven vehicle 1A is a series hybrid type of electrically driven vehicle.

The electrically driven vehicle 1A is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8 coupled with the brake pedal 6 by wires, joined to the brake unit 7 and provided to the front wheels 3 and the rear wheels 2. The acceleration pedal 5 is provided with an acceleration position sensor 26 that senses the amount of depression of the acceleration pedal 5, and the brake pedal 6 is provided with a brake switch 62 that senses whether the brake pedal 6 is depressed or not.

The electrically driven vehicle 1A is further provided with a key switch 21. The key switch 21 is a switch that enables selective switching operation between ON and OFF. The key switch 21 is vehicle drive operation means realized to make an operation request to the generator unit 11A and the electric motor 13. Specifically, when the key switch 21 is ON, the operation request to the electric motor 13 is made. When the key switch 21 is OFF, the operation request to the electric motor 13 is not made. Operation means for making an operation request to the generator unit 11A may be provided separately from the key switch 21, for example.

Figure 4:
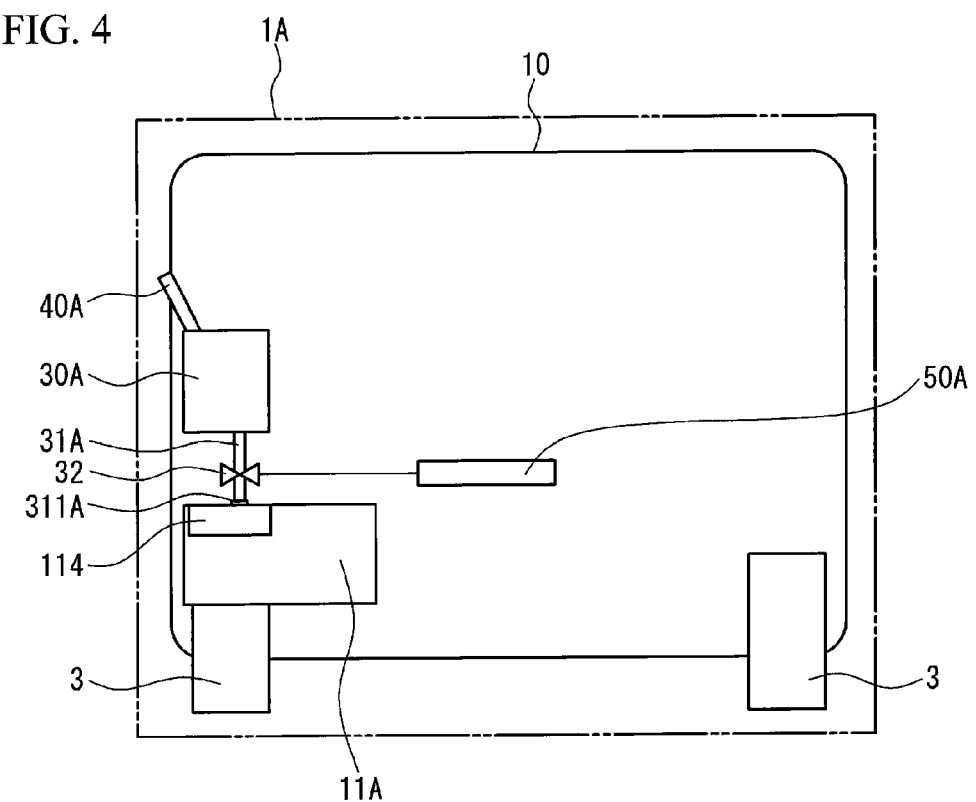
FIG. 4 is a schematic diagram of parts of the electrically driven vehicle in accordance with the first embodiment.

As illustrated in FIG. 4, the electrically driven vehicle 1A is further equipped with a fuel tank 30A on the vehicle side, a fuel pipe 31A, an open/close valve 32 and an oil supply port 40A. The fuel tank 30A on the vehicle side is provided on the vehicle body 10. The fuel tank 30A on the vehicle side is a fuel tank from which oil is supplied from the outside of the vehicle, and stores fuel that is to be supplied to the fuel tank 114 on the generator unit side. The fuel tank 30A on the vehicle side is provided in a position higher than that of the fuel tank 114 on the generator unit side. The fuel tank 30A on the vehicle side corresponds to a first fuel tank.

The fuel pipe 31A is provided so as to detachably connect the fuel tank 30A on the vehicle side and the fuel tank 114 on the generator unit side together. Specifically, one end of the fuel pipe 31A is connected to the fuel tank 30A on the vehicle side, and the other end thereof is detachably connected to the fuel tank 114 on the generator unit side as a detachably attached part 311A that makes it possible to attach and detach the fuel tank 30A on the vehicle side and the fuel tank 114 on the generator unit side to and from each other. The fuel pipe 31A is connected to the fuel tank 114 on the generator unit side so that supplied fuel is poured in the fuel tank 114 on the generator unit side. Specifically, the other end of the fuel pipe 31A is connected to an upper surface of the fuel tank 114 on the generator unit side. The fuel pipe 31A corresponds to a fuel supply system.

The open/close valve 32 is an electromagnetic valve capable of changing the flow state of fuel that passes through the fuel pipe 31A. Specifically, the open/close valve 32 changes the flow state of fuel through the fuel pipe by forming the flow path of the fuel pipe 31A to allow the fuel to pass through the fuel pipe 31A when it is opened and by blocking the flow path of the fuel pipe 31A to stop the fuel from passing through the fuel pipe 31A when it is closed. The open/close valve 32 is provided on the vehicle body 10 side, and is specifically provided to the fuel pipe 31A in a position closer to the fuel tank 30A than the other end of the fuel pipe 31A to which the detachably attached part 311A is provided. The open/close valve 32 corresponds to flow change means.

The oil supply port 40A is a fuel supply port from the outside, and is provided to the vehicle body 10. The oil supply port 40A communicates with the fuel tank 30A on the vehicle side, and oil is supplied to the fuel tank 30A on the vehicle side via the oil supply port 40A.

As illustrated in FIG. 1, the electrically driven vehicle 1A is equipped with an ECU 50A, which is a first control unit. The ECU 50A on the vehicle side is equipped with a microcomputer composed of a CPU, a ROM, a RAM and so on, and an input/output circuit, which are not illustrated. The ECU 113 on the generator unit side, which is a second control unit, is configured similarly. The generator unit 11A (more specifically, the ECU 113 on the generator unit side) is electrically and detachably connected to the ECU 50A on the vehicle side. In this regard, the ECU 50A on the vehicle side and the generator unit 11A are connected together via low-voltage system wires, which are control-system wires. Various objects to be controlled such as the electric motor 13 and the open/close valve 32 (see FIG. 4) are electrically connected to the ECU 50A on the vehicle side, and further, various sensors and switches such as the key switch 21, the acceleration position sensor 61 and the brake switch 62 are electrically connected thereto.

The ROM is configured to store a program in which various processes executed by the CPU are described and to store map data. The CPU executes the processes on the basis of the program stored in the ROM while using a temporary memory area ensured in the RAM as necessary, so that various control means, determination means, detection means and calculation means can be functionally realized in the ECU 50A on the vehicle side and the ECU 113 on the generator unit side.

In this regard, for example, the ECU 50A on the vehicle side functionally realizes control means that controls the open/close valve 32. Specifically, the control means is realized so as to control the open/close valve 32 to intermittently supply fuel to the fuel tank 114 on the generator unit side from the fuel tank 30A on the vehicle side by performing the combination of a control to open the open/close valve 32 and a control to close the open/close valve 32.

In the control of the open/close valve 32, the ECU 50A on the vehicle side functionally realizes estimate means that estimates the amount of remaining fuel stored in the fuel tank 114 on the generator unit side on the basis of the operating state of the generator unit 11A.

Specifically, the estimate means is realized so as to estimate whether the remaining fuel amount is close to an out-of-fuel state by determining whether an abnormality showing an out-of-fuel indication occurs in the generator unit 11A on the basis of the operating state of the generator unit 11A (for example, the number of revolutions of the engine 111 and the magnitude of energy generated by the generator unit 11A).

Specifically, the control means is realized so as to control the open/close valve 32 when it is determined that the remaining amount of fuel is close to the out-of-fuel state on the basis of the remaining fuel amount estimated by the estimate means.

For example, the ECU 50A on the vehicle side functionally realizes operation control means for temporarily operating the generator unit 11A in a case where the control means controls the open/close valve 32 to intermittently supply fuel to the fuel tank 114 on the generator unit side.

In the temporary operation of the generator unit 11A, specifically, the operation control means is realized so as to temporarily operate the generator unit 11A under a condition that makes it possible to remove fuel remaining in a portion of the fuel pipe 31A closer to the fuel tank 114 on the generator unit side other than the open/close valve 32 through which fuel supplied is poured in the fuel tank 114 on the generator unit side irrespective of whether an operation request to the generator unit 11A is issued (hereinafter, referred to as a fuel removal operation condition). The intermittent operation of the generator unit 11A under the fuel removal operation condition may be implemented by operating the generator unit 11A for a predetermined time under a predetermined operating condition.

Figure 5:
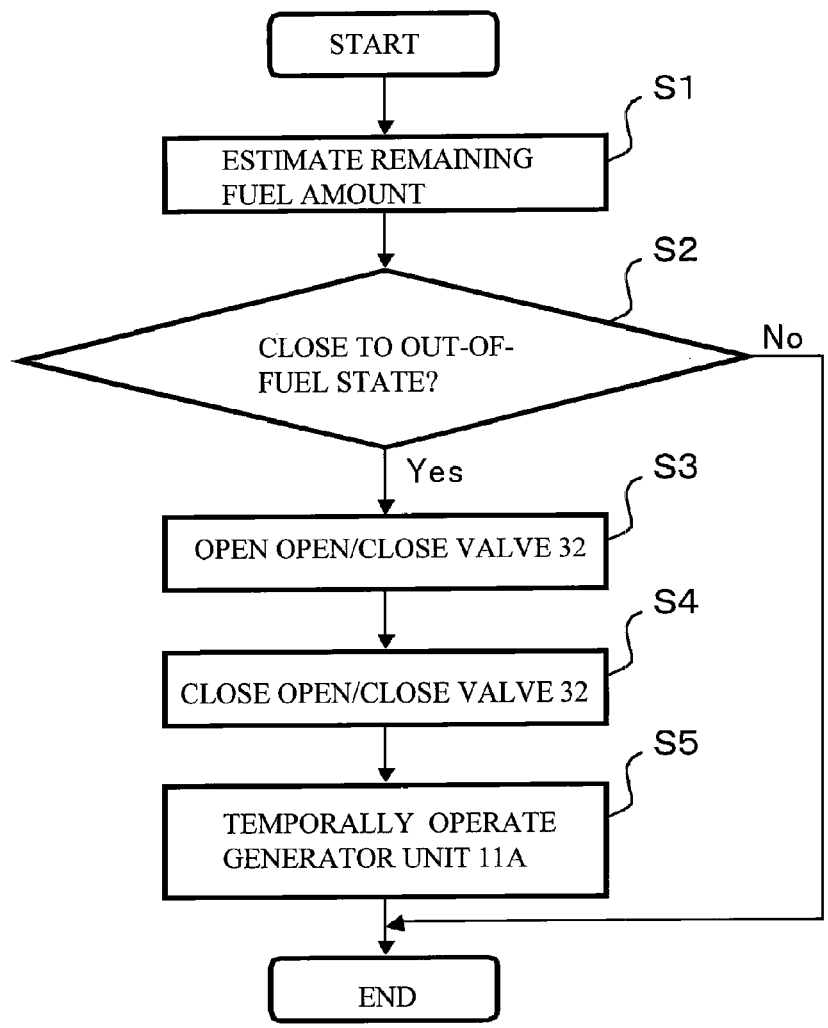
FIG. 5 is a flowchart of an operation of an ECU (Electronic control unit) in accordance with the first embodiment.
Figure 6:
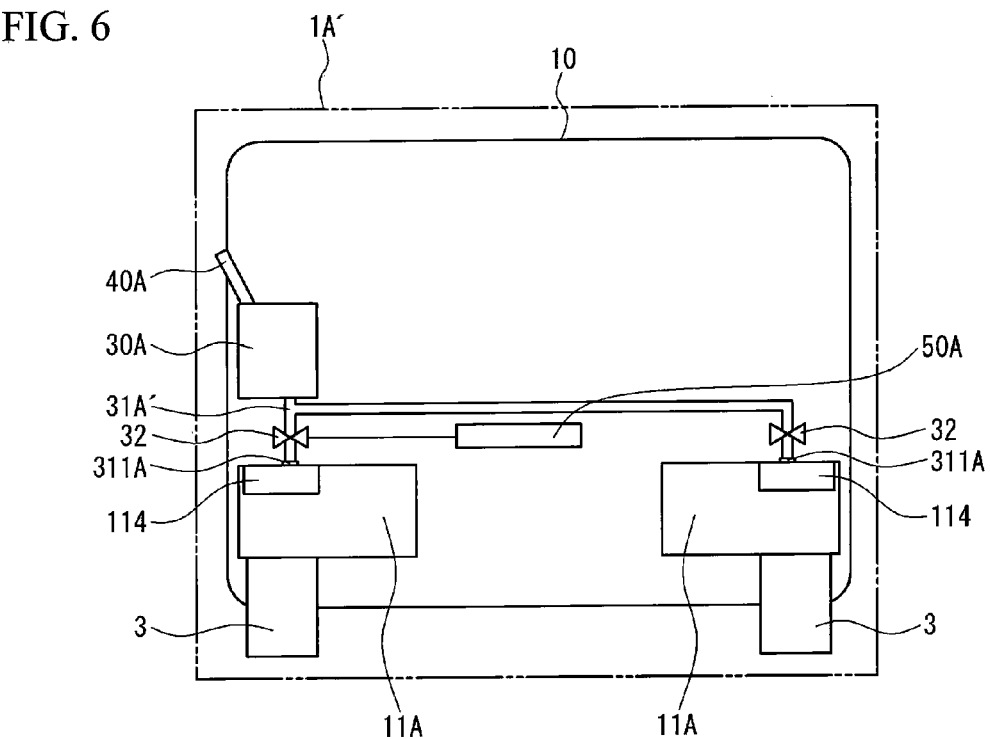
FIG. 6 is a diagram of a first variation of the electrically driven vehicle in accordance with the first embodiment.

Now, a description is given, in conjunction with a flowchart of FIG. 5 performed by the ECU 50A on the vehicle side, of an operation of the ECU 50A on the vehicle side. The present flowchart is repetitively executed at very short intervals while the generator unit 11A mounted in the vehicle is operating. The ECU 50A on the vehicle side estimates the amount of fuel remaining in the fuel tank 114 on the generator unit side on the basis of the operating state of the generator unit 11A (step S1). Next, the ECU 50A on the vehicle side determines whether the remaining fuel amount is close to the out-of-fuel state on the basis of the estimated amount of remaining fuel (step S2). When a negative determination is made in step S2, no specific process is needed and the flowchart is ended. In contrast, when a positive determination is made in step S2, the ECU 50A on the vehicle side opens the open/close valve 32 (step S3). Thus, a fuel supply from the fuel tank 30A on the vehicle side to the fuel tank 114 on the generator unit side is started. Subsequently, the ECU 50A on the vehicle side closes the open/close valve 32 (step S4). This stops supplying fuel to the fuel tank 114 on the generator unit side form the fuel tank 30A on the vehicle side, and intermittently supplies fuel. The timing at which the open/close valve 32 is closed may be controlled appropriately based on time, for example. Then, the ECU 50A on the vehicle side temporarily operates the generator unit 11A under the fuel removal operation condition (step S5).

Next, a description is given of functions and effects of the electrically driven vehicle 1A. In the electrically driven vehicle 1A, the fuel tank 30A on the vehicle side is provided to the vehicle body 10. Thus, in the electrically driven vehicle 1A, the oil supply port 40A can be provided to the vehicle body 10 without being specifically affected by the mounted position of the generator unit 11A in such a manner that the fuel tank 30A on the vehicle side is a fuel tank to be refueled. Thus, the electrically driven vehicle 1A is capable of ensuring the degree of freedom of the mounted position of the generator unit 11A while ensuring the convenience of refuel.

The electrically driven vehicle 1A is capable of ensuring a larger tank capacity by providing the vehicle body 10 with the fuel tank 30A on the vehicle side. Thus, the electrically driven vehicle 1A is capable of having a larger amount of fuel per one refueling and ensuring the convenience of refuel including a reduced frequency of refuel.

The electrically driven vehicle 1A has a larger tank capacity, and is thus capable of ensuring a larger total amount of energy that can be generated by the generator unit 11A without new refuel than the amount of energy that can be ensured at maximum by the original generator unit 11A. Thus, the electrically driven vehicle 1A has improved convenience of coping with a shortage of energy of the battery.

In the electrically driven vehicle 1A, the fuel tank 114 on the generator unit side is provided to the generator unit 11A Therefore, the generator unit 11A can be operated solely after it is removed from the electrically driven vehicle 1A in which the fuel tank 30A on the vehicle side is provided to the vehicle body 10, and the battery 12 can be charged remotely. Specifically, the battery 12 can be charged by the generator unit 11A that is electrically connected to the electrically driven vehicle 1A even when the generator unit 11A is not mounted in the vehicle body 10 by further providing inhibiting means for inhibiting controls of the control means, estimate means and operation control means.

The fuel tank 30A provided to the vehicle body 10 of the electrically driven vehicle 1A may cause fuel leakage in removal of the generator unit 11A. With respect to this, in the electrically driven vehicle 1A, the fuel pipe 31A is connected to the fuel tank 114 on the generator unit side so that fuel supplied is poured into the fuel tank 114 on the generator unit side. Further, the generator unit 11A is temporarily operated under the fuel removal operation condition in the case where fuel is intermittently supplied to the fuel tank 114 on the generator unit side from the fuel tank 30A on the vehicle side. It is thus possible to remove fuel remaining in the fuel pipe 31A that may cause fuel leakage in removal of the generator unit 11A from the electrically driven vehicle 1A. In the electrically driven vehicle 1A, the fuel tank 30A on the vehicle side is provided to the vehicle body 10, whereby the occurrence of fuel leakage can further be prevented in removal of the generator unit 11A.

In the electrically driven vehicle 1A, the fuel tank 30A on the vehicle side is provided in a position higher than that of the fuel tank 114 on the generator unit side. Thus, in the electrically driven vehicle 1A, fuel is supplied under its own weight from the fuel tank 30A on the vehicle side to the fuel tank 114 on the generator unit side. Thus, the electrically driven vehicle 1A has an economically advantageous structure because it does not need any fuel pump for supplying fuel from the fuel tank 30A on the vehicle side to the fuel tank 114 on the generator unit side.

The electrically driven vehicle 1A estimates the amount of fuel remaining in the fuel tank 114 on the generator unit side on the basis of the operating state of the generator unit 11A. Thus, the electrically driven vehicle 1A has an economically advantageous structure because it does not need for sensing of the remaining amount of fuel in the supply of fuel from the fuel tank 30A on the vehicle side to the fuel tank 114 on the generator unit side.

In the electrically driven vehicle 1A, the fuel tank 30A on the vehicle side is provided to the vehicle body 10. Thus, as compared with the case where refuel is performed directly from the fuel tank 114 on the generator unit side, the mounted position of the generator unit 11A may be determined without any particular limitation in view of the convenience of refuel. In this regard, the electrically driven vehicle 1A is configured so that part of the wall portion 114a that forms the fuel tank 114 on the generator unit side is the wall portion of the housing 115 of the generator unit 11A. Thus, in the electrically driven vehicle 1A, the generator unit 11A may be made compact, and the generator unit 11A may easily be mounted on a limited mounting space such as under the floor of the vehicle Thus, the electrically driven vehicle 1A has a higher degree of freedom of selection of the mounted position of the generator unit 11A in addition to no limitation resulting from the convenience of refuel.

The electrically driven vehicle 11A may be varied so as to detachably mount a plurality of generator units 11A. In this case, like an electrically driven vehicle 1A' illustrated in FIG.

6, for example, a fuel pipe 31A' may be substituted for the fuel pipe 31A, in which the fuel pipe 31A' has an end connected to the fuel tank 30A on the vehicle side, and branches into other ends respectively connected to a plurality of (two in this case) fuel tanks 114 on the generator unit side. In this case, the open/close valves 32 may be provided in branch portions of the fuel pipes 31A' through which fuel supplied is poured into the fuel tanks 114. Attaching and detaching parts 311A may be provided in portions of the fuel pipes 31A' closer to the fuel tanks 114 on the generator unit side than the open/close valves 32 (the other ends in this case). This makes it possible to supply fuel to the fuel tanks 114 on the generator unit side from the fuel tank 30A on the vehicle side even when the plurality of generator units 11A are detachably mounted.

Figure 7:
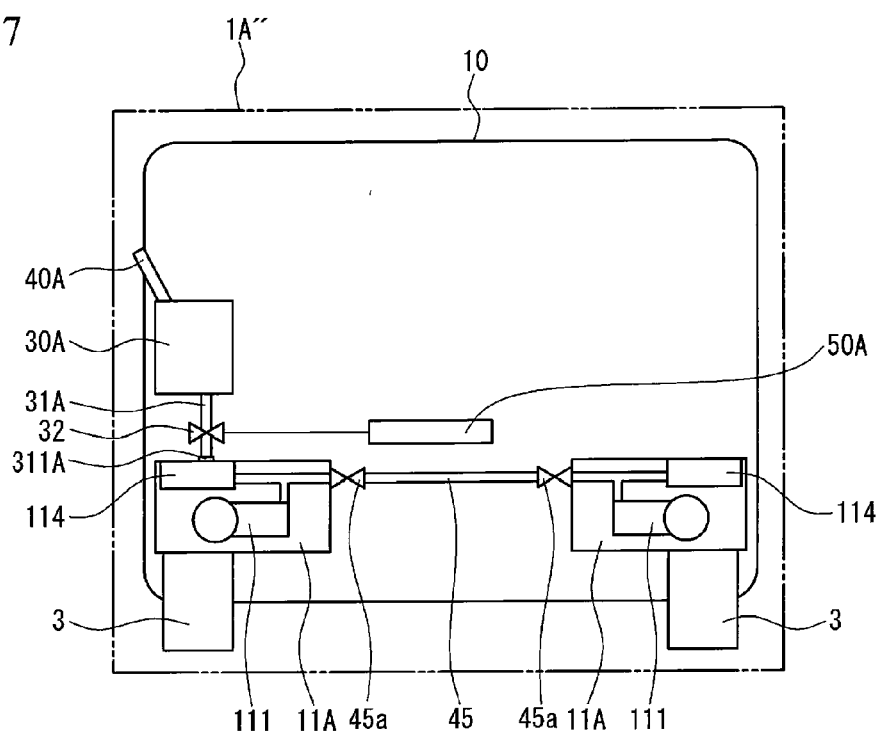
FIG. 7 is a diagram of a second variation of the electrically driven vehicle in accordance with the first embodiment.

Like an electrically driven vehicle 1A" depicted in FIG. 7A, for example, the detachable mounting of the plurality of generator units 11A may be configured to detachably provide a communication pipe 45, which makes the fuel tank 114 of the generator unit 11A that receives fuel from the fuel tank 30A on the vehicle side and the fuel tank 114 of each other generator unit 11A or each engine to communicate with each other. The communication pipe 45 may be detachably provided by using couplers 45a attached to detachable portions. This makes it possible to supply fuel to each fuel tank 114 of each generator unit 11A from the fuel tank 30A on the vehicle side. The communication pipe 45 is preferably provided so that fuel is evenly stored in the fuel tanks 114 on the generator unit side. The electrically driven vehicle 1A" is capable of supplying fuel to the engines 111 of the generator units 11A by only a single fuel pump and realizing cost reduction and fuel economy.

Figure 8:
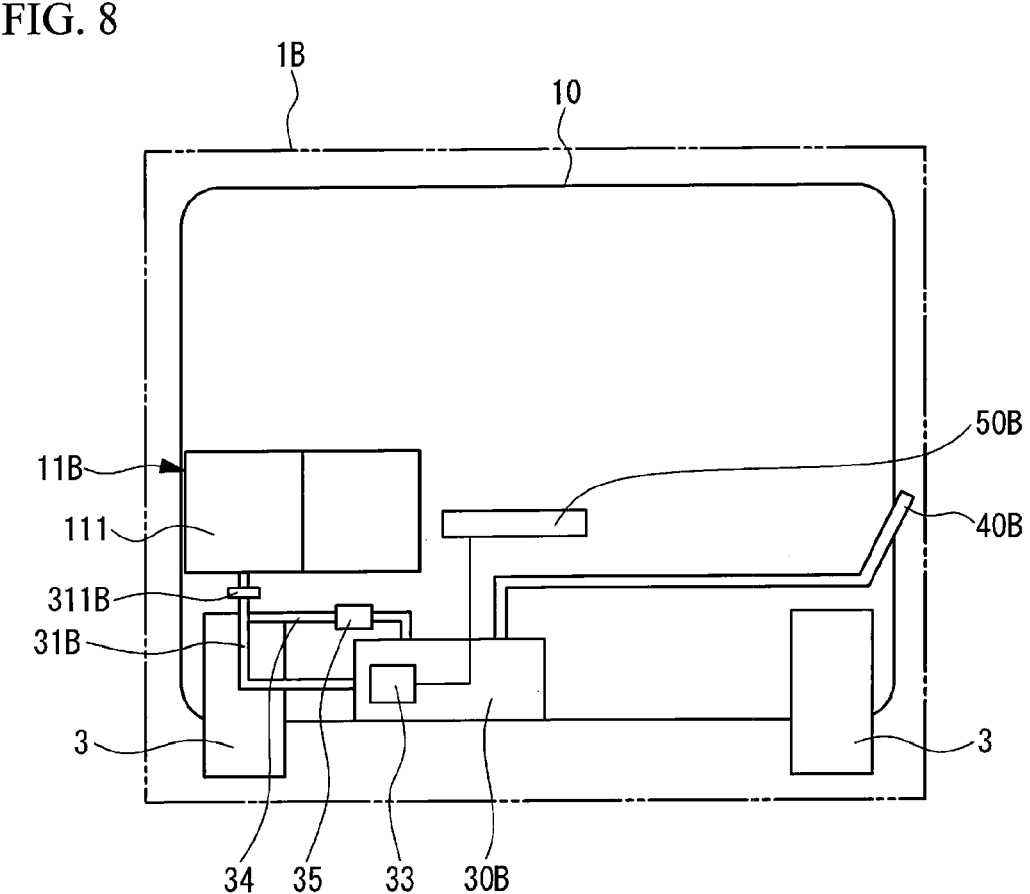
FIG. 8 is a diagram of parts of an electrically driven vehicle in accordance with an embodiment.

Next, a second embodiment is described. As depicted in FIG. 8, an electrically driven vehicle 1B in accordance with the present embodiment is substantially the same as the electrically driven vehicle 1A except that the vehicle 1B is equipped with a generator unit 11B substituted for the generator unit 11A, a fuel tank 30B on the vehicle side substituted for the fuel tank 30A on the vehicle side, a fuel pipe 31B for the fuel pipe 31A, an oil supply port 40B for the oil supply port 40A, and a fuel pump 33 for the open/close valve 32, and is further equipped with a fuel return pipe 34 and a relief valve 35 and that the vehicle 1B is equipped with an ECU 50B on the vehicle side instead of the ECU 50A on the vehicle side.

The generator unit 11B is substantially the same as the generator unit 11A except that the engine 111 of the generator unit 11B is configured to be detachably mounted and the fuel tank 114 on the generator unit side is not provided. The fuel tank 30B on the vehicle side is substantially the same as the fuel tank 30A on the vehicle side except that the fuel pump 33 is provided within the generator unit 11B. The electrically driven vehicle 1B is configured so that the generator unit 11B and the fuel tank 30B on the vehicle side are arranged in such a manner that the fuel tank 30B on the vehicle side is provided in a position lower than that of the engine 111. A fuel pipe 31B is provided so as to detachably connect the fuel tank 30B on the vehicle side and the engine 111 together. A detachably attached part 311B for enabling the fuel tank 30B on the vehicle side and the engine 111 to be attached to or detached from each other is provided in a portion of the fuel pipe 31B connected to the engine 111 from the lower side. The fuel supply port 40B has an arrangement different from that of the fuel supply port 40B, and makes the outside of the electrically driven vehicle 1B and the fuel tank 30A communicate with each other.

The fuel pump 33 is configured to supply fuel to the engine 111 from the fuel tank 30B on the vehicle side with pressure. Specifically, the fuel pump 33 pumps fuel, which flows through the fuel pipe 31B and is then supplied to the engine 111 when the fuel pump 33 is driven. When the fuel pump 33 is stopped to cease pumping, the fuel stops flowing through the fuel pipe 31B, so that a fuel supply to the engine 111 is stopped. The fuel pump 33 corresponds to fuel pumping means and may be understandable as flow changing means.

A fuel return pipe 34 is provided so that one end is connected to a portion of the fuel pipe 31B closer to the fuel tank 30B on the vehicle side than the detachably attached part 311B, and the other end is connected to the fuel tank 30B on the vehicle side, whereby fuel is supplied under its own weight from the fuel pipe 31B to the fuel tank 30B on the vehicle side. The fuel return pipe 34 corresponds to a fuel return system.

Figure 9A:
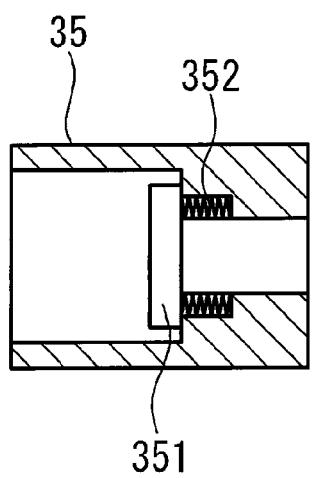
Figure 9B:
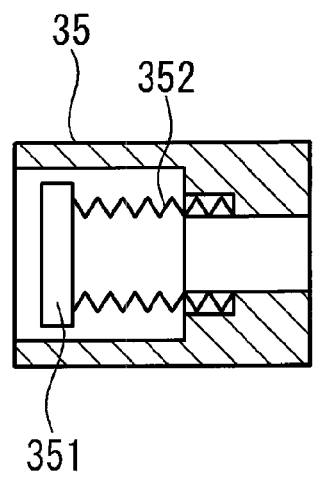

The relief valve 35 is provided in the fuel return pipe 34. As depicted in FIGS. 9(a) and 9(b), specifically, the relief valve 35 includes a valve body 351 and a spring 352. The valve body 351 forms and blocks the flow path. The spring 352 urges the valve body 351 towards the fuel pipe 31B to form the flow path. The spring 352 contracts in accordance with the fuel pressure in the fuel pipe 31B. Specifically, when the fuel pressure in the fuel pipe 31B is equal to or higher than a predetermined value, the spring 352 contracts so that the valve body 351 blocks the flow path, as depicted in FIG. 9(a). In contrast, when the fuel pressure in the fuel pipe 31B is lower than the predetermined value, the spring 352 expands against the fuel pressure so that the valve body 351 forms the flow path, as depicted in FIG. 9(b). The relief valve 35 is closed when the fuel pressure in the fuel pipe 31B is equal to or higher than the predetermined value, and is opened when the fuel pressure is lower than the predetermined value to form the flow path and allow fuel to flow through the flow path. Thus, it is possible to increase the flow rate of fuel that is allowed to flow. The relief valve 35 corresponds to relief means.

The ECU 50B on the vehicle side is substantially the same as the ECU 50A on the vehicle side except that the fuel pump 33 is electrically connected instead of the open/close valve 32, and the estimate means and the operation control means are not realized, and that control means is realized as described below.

The ECU 50B on the vehicle side realizes control means to control the fuel pump 33 instead of the open/close valve 32. Specifically, the control means is realized so as to control the fuel pump 33 to perform and stop a fuel supply to the engine 111 by executing a drive control and stop control to the fuel pump 33 in response to an operation request to the generator unit 11B.

Figure 10:
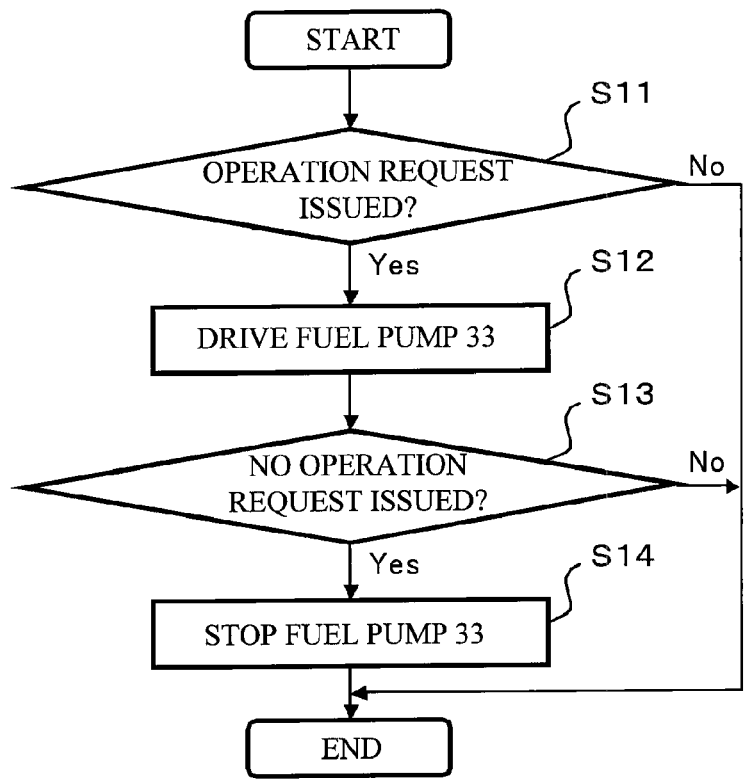
FIG. 10 is a flowchart of an operation of an ECU on the vehicle side in accordance with a second embodiment.

Now, a description is given of an operation of the ECU 50B on the vehicle side in conjunction with a flowchart of FIG. 10. The ECU 50B on the vehicle side determines whether an operation request to the generator unit 11B is issued (step S11). When a negative determination is made, the ECU 50B ends the present flowchart once. In contrast, when a positive determination is made in step S11, the ECU 50B on the vehicle side drives the fuel pump 33 (step S12). This starts a fuel supply to the engine 111 from the fuel tank 30B on the vehicle side. Further, the fuel pressure in the fuel pipe 31B becomes equal to or higher than the predetermined value, and the relief valve 35 is closed. Then, the ECU 50B on the vehicle side determines whether an operation request to the generator unit 11B is issued (step S13). When a negative determination is made, the ECU 50B ends the present flowchart once. In contrast, when a positive determination is made, the ECU 50B on the vehicle side stops driving the fuel pump 33 (step S14). This stops supplying fuel to the engine 111 from the fuel tank 30B on the vehicle side, and fuel is thus supplied intermittently. Also, the fuel pressure in the pressure in the fuel pipe 31B becomes lower than the predetermined value, and the relief valve 35 is thus opened.

Next, a description is given of functions and effects of the electrically driven vehicle 1B. The electrically driven vehicle 1B is also configured to have the fuel tank 30B on the vehicle side to the vehicle body 10. Thus, the electrically driven vehicle 1B is capable of ensuring the degree of freedom of the mounted position of the generator unit 11B while ensuring the convenience of refuel, and is further capable of improving the convenience of coping with a shortage of energy of the battery as well as the electrically driven vehicle 1A.

In the electrically driven vehicle 1B, the engine 111 out of parts of the generator unit 11B is detachably mounted. Thus, in the electrically driven vehicle 1B, the generator unit 11B cannot be operated solely after it is removed from the vehicle body 10, or the battery 12 cannot be charged remotely. However, the load of the installation or removal work on the generator unit 11B is reduced mainly in terms of weight. In terms of a different viewpoint, it may be said that the fuel tank 30B on the vehicle side is provided to the vehicle body 10 in such a manner the engine 111 out of the parts of the generator unit 11B rather than the whole generator unit 11B is detachably mounted, the engine 111 being needed to have a fuel supply from the outside like the electrically driven vehicle 1B, for example.

In the electrically driven vehicle 1B, a fuel leakage may take place in removal of the engine 111 because the fuel tank 30B on the vehicle side is provided to the vehicle body 10. In order to cope with the above, the electrically driven vehicle 1B is configured so that the fuel tank 30B on the vehicle side is provided in a position lower than that of the engine 111, and the fuel pump 33 capable of pumping fuel to the engine 111 from the fuel tank 30B on the vehicle side and that the fuel return pipe 34 and the relief valve 35 are provided. Therefore, the electrically driven vehicle 1B is capable of removing, from the fuel pipe 31B, the residual fuel that may cause a fuel leakage in removal of the engine 111. Thus, the electrically driven vehicle 1B is capable of preventing the occurrence of a fuel leakage in removal of the engine 111 due to the attachment of the fuel tank 40B on the vehicle side to the vehicle body 10.

Figure 11:
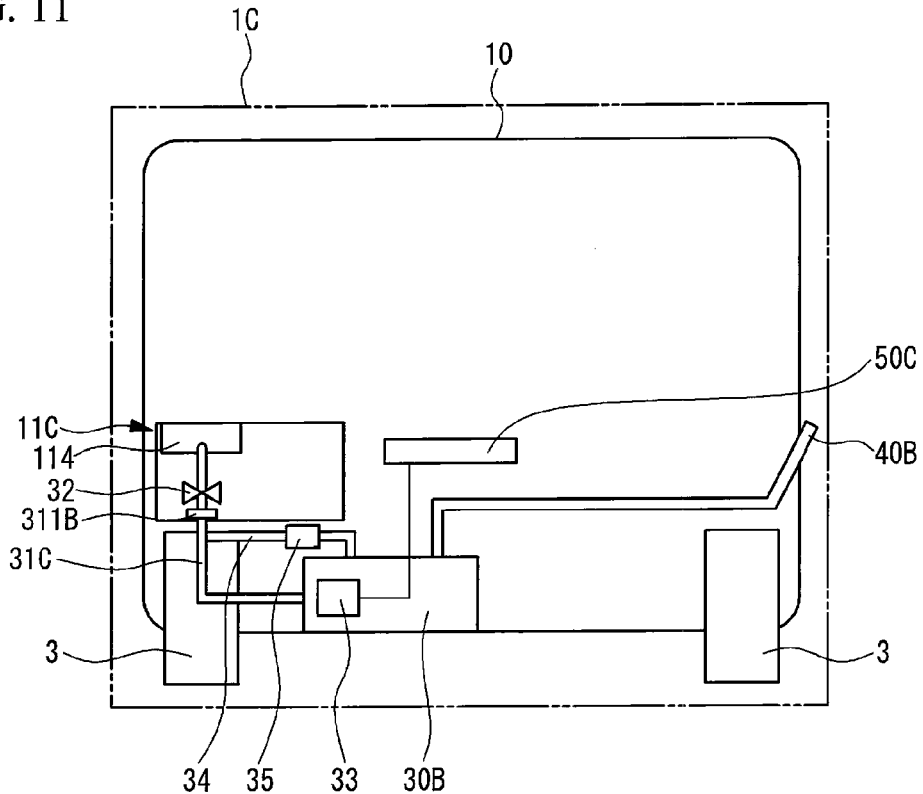
FIG. 11 is a diagram of a variation of the electrically driven vehicle in accordance with the second embodiment.

The electrically driven vehicle 1B may be varied so that the whole generator unit is detachably mounted like the electrically driven vehicle 1C depicted in FIG. 11, for example. In the electrically driven vehicle 1C, a generator unit 11C is mounted instead of the generator unit 11B. Further, the electrically driven vehicle 1C is provided with a fuel pipe 31C, which detachably connects the fuel tank 114 of the generator unit 11C and the fuel tank 30B on the vehicle side together. Thus, the fuel pump 33 corresponds to fuel pump means capable of pumping fuel to the fuel tank 114 on the generator unit side from the fuel tank 30B on the vehicle side.

A detachably attached part 311B is provided to the fuel pipe 31C like the fuel pipe 31B. The open/close valve 32 is provided to a portion of the fuel pipe 31C closer to the fuel tank 114 on the generator unit side than the detachably attached part 311B as means for permitting and inhibiting a passage of fuel. Thus, the open/close valve 32 is provided in the generator unit 11C, and the electrically driven vehicle 1C is configured so that the open/close valve 32 is electrically connected to the ECU 113 on the generator unit side. The generator unit 11C is configured by adding the open/close valve 32 to the generator unit 11A.

The electrically driven vehicle is equipped with the ECU 50C on the vehicle side substituted for the ECU 50B on the vehicle side. The ECU 50C on the vehicle side functionally realizes control means that controls the open/close valve 32 and the fuel pump 33 to intermittently supply fuel to the fuel tank 114 on the generator unit side, and functionally realizes estimate means in a similar manner to that realized by the ECU 50A on the vehicle side. Specifically, the control means is functionally realized to intermittently supply fuel to the fuel tank 114 on the generator unit side by controlling the open/close valve 32 to be opened in association with the drive control of the fuel pump 33, and to be closed in association with the stop control of the fuel pump 33. In this regard, the open/close valve 32 is structured to be controlled by the ECU 50C on the vehicle side via the ECU 113 on the generator unit side. Thus, the electrically driven vehicle 1C is also capable of ensuring the degree of freedom of the mounted position of the generator unit 11C while ensuring the convenience of refuel, and is further capable of improving the convenience of coping with a shortage of energy of the battery. Further, the electrically driven vehicle 1C is capable of preventing the occurrence of a fuel leakage in removal of the generator unit 11C.

The above-described first and second embodiments are preferred exemplary embodiments of the invention. However, the present invention is not limited to those embodiments but may be varied variously without departing from the essentials of the present invention.

For example, in the above-described first embodiment, a case has been described where the fuel tank 30A on the vehicle side is provided in a position higher than that of the fuel tank 114 on the generator unit side because the first embodiment has a suitable arrangement in which fuel is supplied under its own weight from the fuel tank 30A on the vehicle side to the fuel tank 114 on the generator unit side. However, the present invention is not necessarily limited to the above, but may have another exemplary arrangement in which the first fuel tank is provided in a position lower than that of the second fuel tank. In this case, the flow change means may be fuel pumping means that is provided in the first fuel tank and is capable of pumping fuel to the second fuel tank from the first fuel tank.

The various means functionally realized by each ECU 50 on the vehicle side in the first and second embodiments may be realized by hardware such as another electronic control unit and a dedicated electronic circuit or its combination.

DESCRIPTION OF NUMERAL NUMBERS 1A, 1A', 1A", 1B, 1C electrically driven vehicle
10 vehicle body
11A, 11b, 11C generator unit
111 engine
114 fuel tank on a generator unit side
12 battery
30A, 30B fuel tank on a vehicle side
31A, 31A', 31B, 31C fuel pipe
32 open/close valve
33 fuel pump
34 fuel return pipe
35 relief valve
351 valve body
352 spring
40A, 40B oil supply port
45 communication pipe
50A, 50B, 50C ECU on a vehicle side

The invention claimed is:

1. An electrically driven vehicle comprising:
a vehicle body;
a battery that is mounted in the vehicle body and is usable for running;

a generator unit that is detachably mounted in the vehicle body and charges the battery, a first fuel tank that stores fuel supplied to the generator unit being provided in the vehicle body, the generator unit including a second fuel tank that stores fuel for the generator unit; and a fuel supply system being provided so as to detachably connect the first and second fuel tanks together, the fuel supply system being connected to the second fuel tank so that fuel supplied is poured into the second fuel tank, the electrically driven vehicle further comprising:

flow change means capable of changing a flow state of fuel passing through the fuel supply system;

control means for controlling the flow change means so as to intermittently supply the fuel to the second fuel tank; and operation control means for making the generator unit temporarily operate when the control means controls the flow change means to intermittently supply the fuel to the second fuel tank.

2. An electrically driven vehicle comprising:

a vehicle body;

a battery that is mounted in the vehicle body and is usable for running;

a generator unit that is detachably mounted in the vehicle body and charges the battery, a first fuel tank that stores fuel supplied to the generator unit being provided in the vehicle body, the generator unit including a second fuel tank that stores fuel for the generator unit;

a fuel supply system being provided so as to detachably connect the first and second fuel tanks together, wherein:

the first fuel tank is provided in a position lower than that of the second fuel tank, and a detachably attached part that makes it possible to attach and detach the first fuel tank and the second fuel tank to and from each other is provided to a portion of the fuel supply system extending to the second fuel tank from a lower side thereof, switch means capable of allowing the fuel to pass and inhibiting the fuel from passing being provided to another portion of the fuel supply system closer to the second fuel tank than the detachable attached part; and the electrically driven vehicle further comprises:

fuel pumping means that is provided in the first fuel tank and is capable of pumping the fuel from the first fuel tank to the second fuel tank;

control means for controlling the fuel pumping means and the switch means so as to intermittently supply the fuel to the second fuel tank;

a fuel return system that has one end connected to a portion of the fuel supply system closer to the first fuel tank than the detachably attached part and another end connected to the first fuel tank, and is provided so that the fuel flows under its own weight from the fuel supply system to the first fuel tank; and relief means, provided in the fuel return system, for increasing the fuel passing therethrough in accordance with a pressure of the fuel in the fuel supply system when the pressure of the fuel is lower than a predetermined value.

3. The electrically driven vehicle according to claim 1, further comprising estimate means for estimating an amount of fuel remaining in the second fuel tank on the basis of an operation state of the generator unit.

4. The electrically driven vehicle according to claim 1, wherein a wall portion of a housing of the generator unit is included in at least part of a wall portion that forms the second fuel tank.

5. An electrically driven vehicle comprising:

a vehicle body;

a battery that is mounted in the vehicle body and is usable for running;

a generator unit that is detachably mounted in the vehicle body and charges the battery, a first fuel tank that stores fuel supplied to the generator unit being provided in the vehicle body, the generator unit being an engine driven type of generator unit, a fuel supply system being provided so as to detachably mount the engine of the generator unit and to detachably connect the first fuel tank and the engine together, the first fuel tank is provided in a position lower than that of the engine, and a detachably attached part that makes it possible to attach and detach the first fuel tank and the engine to and from each other is provided to a portion of the fuel supply system extending to the engine from a lower side thereof;

the electrically driven vehicle further comprising:

fuel pumping means that is provided in the first fuel tank and is capable of pumping the fuel from the first fuel tank to the engine;

control means for controlling the fuel pumping means so as to supply the fuel to the engine and stop supplying the fuel to the engine;

a fuel return system that has one end connected to a portion of the fuel supply system closer to the first fuel tank than the detachably attached part and another end connected to the first fuel tank, and is provided so that the fuel flows under its own weight from the fuel supply system to the first fuel tank; and relief means, provided in the fuel return system, for increasing the fuel passing therethrough in accordance with a pressure of the fuel in the fuel supply system when the pressure of the fuel is lower than a predetermined value.

6. An electrically driven vehicle comprising:

a vehicle body;

a battery that is mounted in the vehicle body and is usable for running;

a generator unit that is detachably mounted in the vehicle body and charges the battery, a first fuel tank that stores fuel supplied to the generator unit being provided in the vehicle body, the generator unit including a second fuel tank that stores fuel for the generator unit, and a fuel supply system being provided so as to detachably connect the first and second fuel tanks together, the fuel supply system being connected to the second fuel tank so that fuel supplied is poured into the second fuel tank, the electrically driven vehicle further comprising:

a flow change part configured to change a flow state of fuel passing through the fuel supply system;

a control part configured to control the flow change part so as to intermittently supply the fuel to the second fuel tank; and an operation control part configured to make the generator unit temporarily operate when the control part controls the flow change part to intermittently supply the fuel to the second fuel tank.

7. An electrically driven vehicle comprising:
a vehicle body;
a battery that is mounted in the vehicle body and is usable for running;
a generator unit that is detachably mounted in the vehicle body and charges the battery,
a first fuel tank that stores fuel supplied to the generator unit being provided in the vehicle body,
the generator unit including a second fuel tank that stores fuel for the generator unit, and
a fuel supply system being provided so as to detachably connect the first and second fuel tanks together, wherein
the first fuel tank is provided in a position lower than that of the second fuel tank, and a detachably attached part that makes it possible to attach and detach the first fuel tank and the second fuel tank to and from each other is provided to a portion of the fuel supply system extending to the second fuel tank from a lower side thereof, a switch part configured to allow the fuel to pass and inhibiting the fuel from passing being provided to another portion of the fuel supply system closer to the second fuel tank than the detachable attached part; and
the electrically driven vehicle further comprises:
a fuel pumping part provided in the first fuel tank and configured to pump the fuel from the first fuel tank to the second fuel tank;
a control part configured to control the fuel pumping part and the switch part so as to intermittently supply the fuel to the second fuel tank;
a fuel return system that has one end connected to a portion of the fuel supply system closer to the first fuel tank than the detachably attached part and another end connected to the first fuel tank, and is provided so that the fuel flows under its own weight from the fuel supply system to the first fuel tank; and
a relief part provided in the fuel return system and configured to increase the fuel passing therethrough in accordance with a pressure of the fuel in the fuel supply system when the pressure of the fuel is lower than a predetermined value.

8. An electrically driven vehicle comprising:
a vehicle body;
a battery that is mounted in the vehicle body and is usable for running;
a generator unit that is detachably mounted in the vehicle body and charges the battery,
a first fuel tank that stores fuel supplied to the generator unit being provided in the vehicle body,
the generator unit being an engine driven type of generator unit,
a fuel supply system being provided so as to detachably mount the engine of the generator unit and to detachably connect the first fuel tank and the engine together,
the first fuel tank being provided in a position lower than that of the engine, and a detachably attached part that makes it possible to attach and detach the first fuel tank and the engine to and from each other being provided to a portion of the fuel supply system extending to the engine from a lower side thereof,
the electrically driven vehicle further comprising:
a fuel pumping part provided in the first fuel tank and configured to pump the fuel from the first fuel tank to the engine;
a control part configured to control the fuel pumping part so as to supply the fuel to the engine and stop supplying the fuel to the engine;
a fuel return system that has one end connected to a portion of the fuel supply system closer to the first fuel tank than the detachably attached part and another end connected to the first fuel tank, and is provided so that the fuel flows under its own weight from the fuel supply system to the first fuel tank; and
a relief part provided in the fuel return system and configured to increase the fuel passing therethrough in accordance with a pressure of the fuel in the fuel supply system when the pressure of the fuel is lower than a predetermined value.

\* \* \* \* \*